US010002000B2

(12) United States Patent
Whaley et al.

(10) Patent No.: US 10,002,000 B2
(45) Date of Patent: Jun. 19, 2018

(54) TRACE-ASSISTED STARTUP OPTIMIZATION FROM A VIRTUAL DISK

(75) Inventors: John Whaley, Fremont, CA (US); Thomas Joseph Purtell, II, Menlo Park, CA (US)

(73) Assignee: Open Invention Network, LLC, Durham, NC (US)

( * ) Notice: Subject to any disclaimer, the term of this patent is extended or adjusted under 35 U.S.C. 154(b) by 634 days.

(21) Appl. No.: 13/036,367

(22) Filed: Feb. 28, 2011

(65) Prior Publication Data

US 2011/0145496 A1    Jun. 16, 2011

Related U.S. Application Data

(63) Continuation-in-part of application No. 12/100,238, filed on Apr. 9, 2008, now Pat. No. 8,087,017.

(60) Provisional application No. 60/910,771, filed on Apr. 9, 2007.

(51) Int. Cl.
*G06F 12/02* (2006.01)
*G06F 9/44* (2018.01)
*G06F 11/36* (2006.01)
*G06F 9/45* (2006.01)
*G06F 3/06* (2006.01)

(52) U.S. Cl.
CPC ............ *G06F 9/4401* (2013.01); *G06F 3/061* (2013.01); *G06F 3/064* (2013.01); *G06F 3/0632* (2013.01); *G06F 3/0664* (2013.01); *G06F 8/4442* (2013.01); *G06F 11/3636* (2013.01)

(58) Field of Classification Search
CPC ......................... G06F 11/3636; G06F 8/4442
See application file for complete search history.

(56) References Cited

U.S. PATENT DOCUMENTS

| | | | | |
|---|---|---|---|---|
| 5,920,896 A * | 7/1999 | Grimsrud et al. | | 711/165 |
| 6,105,117 A * | 8/2000 | Ripley | | 711/165 |
| 6,219,752 B1 * | 4/2001 | Sekido | | 711/114 |
| 6,253,296 B1 * | 6/2001 | Grimsrud et al. | | 711/165 |
| 6,532,548 B1 * | 3/2003 | Hughes | | 714/6.21 |
| 6,742,080 B1 * | 5/2004 | Grimsrud et al. | | 711/112 |
| 7,047,366 B1 * | 5/2006 | Ezra | G06F 12/0804 | 711/129 |
| 7,359,890 B1 * | 4/2008 | Ku | G06F 17/3048 | |
| 7,529,897 B1 * | 5/2009 | Waldspurger | G06F 11/1438 | 711/161 |
| 7,620,983 B1 * | 11/2009 | Satish | | 726/22 |
| 7,725,506 B1 * | 5/2010 | Stringham | | 707/822 |
| 7,818,807 B1 * | 10/2010 | McCorkendale et al. | | 726/24 |
| 8,332,570 B1 * | 12/2012 | Cook et al. | | 711/6 |
| 2006/0020749 A1 * | 1/2006 | Waldvogel | | 711/165 |
| 2006/0253656 A1 * | 11/2006 | Donawa et al. | | 711/137 |
| 2007/0113036 A1 * | 5/2007 | Gal-Oz | | 711/165 |

(Continued)

*Primary Examiner* — Charles Rones
*Assistant Examiner* — Tian-Pong Chang
(74) *Attorney, Agent, or Firm* — Haynes and Boone, LLP

(57) ABSTRACT

The disclosed embodiments provide a system that manages the use of a virtual disk. During operation, the system obtains trace data associated with a startup process that reads blocks from the virtual disk. Next, the system physically rearranges the blocks based on the trace data to increase the speed of the startup process. During execution of the startup process, the system also determines a progress of the startup process and uses the progress and the trace data to prefetch blocks from the virtual disk for use by the startup process.

40 Claims, 8 Drawing Sheets

(56) References Cited

U.S. PATENT DOCUMENTS

2007/0204108 A1* 8/2007 Griswell et al. .............. 711/137
2008/0013418 A1* 1/2008 Hsueh ................ G11B 7/00375
　　　　　　　　　　　　　　　　　　　369/47.1

* cited by examiner

TRACE-ASSISTED STARTUP OPTIMIZATION FROM A VIRTUAL DISK

RELATED APPLICATION

This application is a continuation-in-part application of U.S. patent application Ser. No. 12/100,238 by inventors John Whaley, Won-Suk Chun, Monica Sin-ling Lam, and Constantine P. Sapuntzakis, entitled "Trace-Assisted Prefetching of Virtual Machines in a Distributed System," filed 9 Apr. 2008, which claims the benefit of U.S. Provisional Application No. 60/910,771, entitled "Trace-Assisted Prefetching of Virtual Machines in a Distributed System," by inventors John Whaley, Won Chun, Monica Lam, and Constantine P. Sapuntzakis, filed 9 Apr. 2007.

BACKGROUND

Field

The disclosed embodiments relate to techniques for facilitating the use of virtual disks. More specifically, the disclosed embodiments relate to a method and system for optimizing the execution of a startup process that reads blocks from a virtual disk.

Related Art

Virtual machines executing on computer systems can be managed from virtual disks within the computer systems. For example, a virtual machine executing a guest operating system on a personal computer may be loaded into memory on the personal computer by executing a boot-up process that reads blocks from the virtual disk. In addition, changes made to the virtual machine and/or snapshots taken of the virtual machine may be stored in the virtual disk so that subsequent execution of the virtual machine may utilize the changes and/or snapshots.

However, the loading and execution of a virtual machine from a virtual disk may be slow and/or inefficient. In particular, adjacent blocks in the virtual disk may be written to locations that are distant from one another on a physical disk (e.g., hard disk drive (HDD)), resulting in increased latency and/or seek times for I/O operations that read blocks from the virtual disk. A boot-up process that loads a guest operating system from the virtual disk may thus execute more slowly than a boot-up process that loads a host operating system directly from the physical disk.

Hence, what is needed is a mechanism for increasing the speed of boot-up processes that load virtual computing environments from virtual disks.

BRIEF DESCRIPTION OF THE FIGURES

In the figures, like reference numerals refer to the same figure elements.

DETAILED DESCRIPTION

Figure 1:
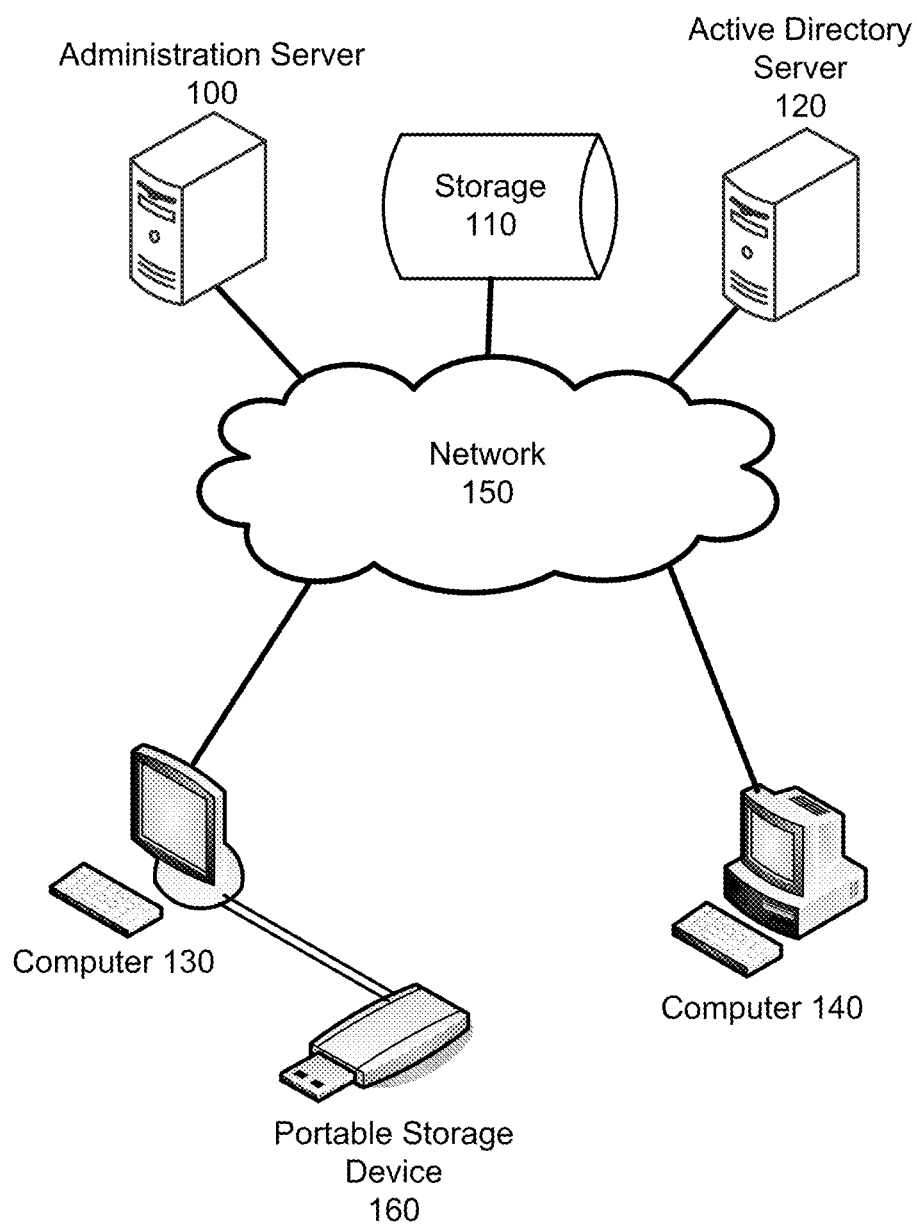
FIG. 1 shows a schematic of a system in accordance with an embodiment.

Virtual disks may ideally be used in the execution and persistence of virtual machines and/or other virtual computing environments on computer systems. For example, a guest operating system that executes within a virtual machine may be stored within one or more virtual disks in a computer system. Input/output (I/O) operations to the virtual disk may be made to load the guest operating system within the computer system, execute the guest operating system, and update the guest operating system, just as I/O operations to physical disks are made to execute native operating systems and applications. Furthermore, because data for the virtual disk is consolidated (e.g., stored in a single directory on a host filesystem of the computer system), the guest operating system may easily be moved to a different location on the computer system or to a different computer system.

Additional improvements to virtual disks may further facilitate the management and execution of virtual computing environments from the virtual disks. To reduce the startup times of the virtual computing environments, blocks in the virtual disks may be physically rearranged and/or replicated to reflect the order in which the blocks are read by startup processes that load the virtual computing environments from the virtual disks. The blocks may also be moved to buffer memory (e.g., disk buffer, flash memory, etc.) on a physical disk to further expedite processing of I/O operations during startup. Finally, the blocks may be prefetched and stored in a cache for use by the startup processes during execution of the startup processes.

Embodiments provide a method and system for facilitating the use of a virtual disk. Data for the virtual disk may be stored in a virtual disk file that resides on a physical disk (e.g., hard disk drive (HDD)) in a computer system. The data may be associated with a virtual computing environment executing on the computer system, such as a virtual machine. For example, a guest operating system may be loaded within a virtual machine in the computer system by executing a startup process that reads blocks from the virtual disk.

More specifically, embodiments provide a method and system for facilitating the execution of the startup process. Trace data associated with the startup process may be generated by recording input/output (I/O) operations during previous execution of the startup process into a trace file. The trace data may then be used to physically rearrange the blocks in a way that increases the speed of the startup process. For example, the blocks may be reordered and/or replicated to reflect the read order of the blocks from the trace data and/or moved to buffer memory on a physical disk that contains data for the virtual disk.

The trace data may additionally be used during execution of the startup process. In particular, a progress of the startup process may be determined during execution of the startup process. Next, the progress and the trace data may be used to prefetch blocks from the virtual disk and/or reorder I/O operations issued by the startup process. The prefetched blocks may further be decompressed, decrypted, and/or hash-checked prior to storing the blocks in a cache for use by the startup process.

FIG. 1 shows a schematic of a system in accordance with an embodiment. As shown in FIG. 1, the system includes an administration server 100, storage 110, an active directory server 120, a set of computers 130-140, a network 150, and a portable storage device 160. Each of the components is described in further detail below.

Computers 130-140 may correspond to electronic computing devices that operate as computing devices for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, Internet, and/or another type of network that facilitates communication among devices (e.g., administration server 100, storage 110, active directory server 120, computers 130-140) connected to network 150. For example, computers 130-140 may operate as clients in network 150 and allow users of computers 130-140 to send and receive emails, retrieve webpages, and/or exchange files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux (Linux™ is a registered trademark of Linus Torvalds), Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation (Windows), VMware Fusion (Mac) (VMware Fusion™ is a registered trademark of VMware, Inc.), Parallels (Parallels™ is a registered trademark of Parallels Software International, Inc.), and VirtualBox (VirtualBox™ is a registered trademark of Oracle America, Inc.) may be used to provide these capabilities.

In one or more embodiments, the system of FIG. 1 enables the central management and local execution of virtual computing environments. Such central management and local execution may allow virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc. a Delaware corporation). In particular, the MokaFive Player may be used with computers 130-140 to locally execute a centrally defined and managed virtual computing environment according to rules and access controls defined in the MokaFive Server.

In one or more embodiments, administration server 100 is a server that supports centralized definition of virtual computing environments and management of access and permissions to the same for local execution. For example, administration server 100 may correspond to the MokaFive Server. Administration server 100 may itself execute in a virtual computing environment, (e.g. a VMware ESX environment). For example, an administrator of virtual computing environments for computers 130-140 may create, configure, and delete the virtual computing environments by interacting with administration server 100 through a management interface (e.g., graphical user interface (GUI), web-based user interface, etc.) provided by administration server 100.

In one or more embodiments, active directory server 120 provides network-based directory services. For example, active directory server 120 may correspond to a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies to virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

In particular, each computer 130-140 may include one or more subscriptions to virtual computing environments. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user.

Furthermore, virtual computing environments executing on computers 130-140 may be stored on and/or loaded from portable storage devices (e.g., portable storage device 160) coupled to computers 130-140, including Universal Serial Bus (USB) flash drives, flash memory cards, and/or portable computing devices (e.g., mobile phones, portable media players, etc.). Portable storage device 160 may also include virtualization software (e.g., hypervisors), subscription information, user data, and/or other information required to load the virtual computing environments into any compatible computer (e.g., x86 computers) without pre-installation of software on the computer. In other words, the virtual computing environments and all information and software required to execute the virtual computing environments may be loaded, stored, and managed entirely from portable storage device 160 instead of from computers 130-140 and/or network 150.

In one or more embodiments, virtual computing environments on computers 130-140 are loaded, executed, and updated from virtual disks in computers 130-140. The virtual disks may correspond to files on computers 130-140 that appear as physical disk drives to computers 130-140. Because data for each virtual disk is stored in one or more files, the virtual disk may be easily transferred between computers 130-140, storage 110, administration server 100, and/or other devices connected to network 150. Easy transfer of virtual disks between devices may additionally enhance the deployment of the virtual computing environments to computers 130-140 from network 150, as well as the backup of the virtual computing environments on storage 110 and/or other storage mechanisms.

In addition, the virtual disks may include features that improve the startup performance of the virtual computing environments. As discussed below, such features may enable efficient boot-ups of the virtual machines on computers 130-140, thus increasing the usability of the virtual computing environments on computers 130-140.

Figure 2:
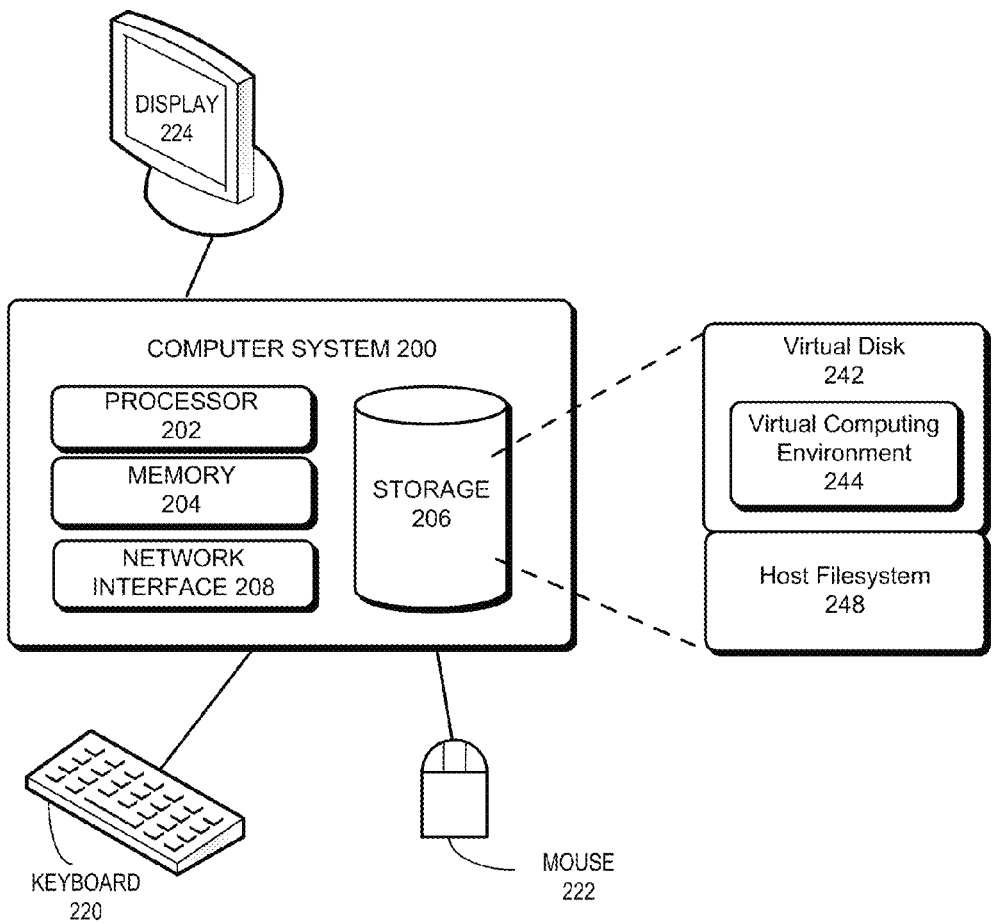
FIG. 2 shows a computer system in accordance with an embodiment.

FIG. 2 shows a computer system 200 in accordance with an embodiment. Computer system 200 may correspond to an electronic computing device (e.g., computers 130-140 of FIG. 1) that is connected to a network, such as network 150 of FIG. 1. Computer system 200 includes a processor 202, memory 204, storage 206, network interface 208, and/or other components found in electronic computing devices. Processor 202 may support parallel processing and/or multi-threaded operation with other processors in computer system 200. Computer system 200 may also include input/output (I/O) devices such as a keyboard 220, a mouse 222, and a display 224.

Computer system 200 may include functionality to execute various components of the present embodiments. Computer system 200 may include a host operating system (not shown) that coordinates the use of hardware and software resources on computer system 200, as well as one or more applications that perform specialized tasks for the user. To perform tasks for the user, applications may obtain the use of hardware resources on computer system 200 from the host operating system, as well as interact with the user through a hardware and/or software framework provided by the host operating system.

In particular, computer system 200 may manage the execution of a virtual computing environment 244 from a virtual disk 242. Virtual disk 242 may exist separately from a host filesystem 248 in computer system 200 and appear as a physical disk to computer system 200. Alternatively (e.g., more commonly), virtual disk 242 may be stored in one or more files in host filesystem 248. Virtual disk 242 may be obtained from network-accessible storage (e.g., storage 110 of FIG. 1) using network interface 208 according to instructions specified by an administration server (e.g., administration server 100 of FIG. 1). A hypervisor (not shown) on computer system 200 may then load virtual computing environment 244 into computer system 200 from virtual disk 242 for local execution of virtual computing environment 244 on computer system 200.

In one or more embodiments, the hypervisor corresponds to a hosted hypervisor (e.g., type II hypervisor) that runs within the host operating system and obtains resources for the domains through the host operating system. Alternatively, the hypervisor may function as a native hypervisor (e.g., type I hypervisor) that runs directly on hardware in computer system 200. The hypervisor may also be referred to as a virtual machine monitor.

Within computer system 200, virtual computing environment 244 may execute independently of a network connection with the administration server and/or storage, subject to any security policies defined for virtual computing environment 244 on the administration server. Alternatively, virtual computing environment 244 may require an intermittent and/or constant connection to the network as specified by a security policy on the administration server. For example, virtual computing environment 244 may continue executing on computer system 200 only if computer system 200 is capable of communicating with the administration server on a periodic basis (e.g., weekly). Such periodic communication may be required to enforce security in virtual computing environment 244 and/or to enable remote termination of virtual computing environment 244 from the administration server. A network connection may also be required for updates to virtual computing environment 244 to be received by computer system 200 from the network in accordance with a notification from the administration server.

In one or more embodiments, the execution of virtual computing environment 244 is facilitated by increasing the boot-up speed of virtual computing environment 244 from virtual disk 242. In particular, a disk emulator associated with virtual disk 242 may include functionality to obtain trace data associated with a startup process (e.g., boot-up process) that loads virtual computing environment 244 by reading blocks from virtual disk 242. The trace data may be used to physically rearrange and/or replicate the blocks in virtual disk 242 to reflect the read order of the blocks. The trace data may also be used to move the blocks to faster memory (e.g., buffer memory, flash memory, etc.) on a physical disk that contains data for virtual disk 242. Finally, the trace data may be used during execution of the startup process to prefetch blocks from virtual disk 242 for use by the startup process and/or rearrange I/O operations issued by the startup process to reduce latency associated with performing the I/O operations. The operation and functionality of virtual disk 242 is discussed in further detail below with respect to FIGS. 3-5.

Virtual disk 242 may also be used to load, store, and manage data not associated with virtual computing environment 244. For example, virtual disk 242 may enable access to remote data storage over the network, manage changes to native applications and/or files on computer system 200, and/or serve as a backup for a physical disk (e.g., compact disk (CD), digital video disk (DVD), floppy disk, etc.).

Figure 3:
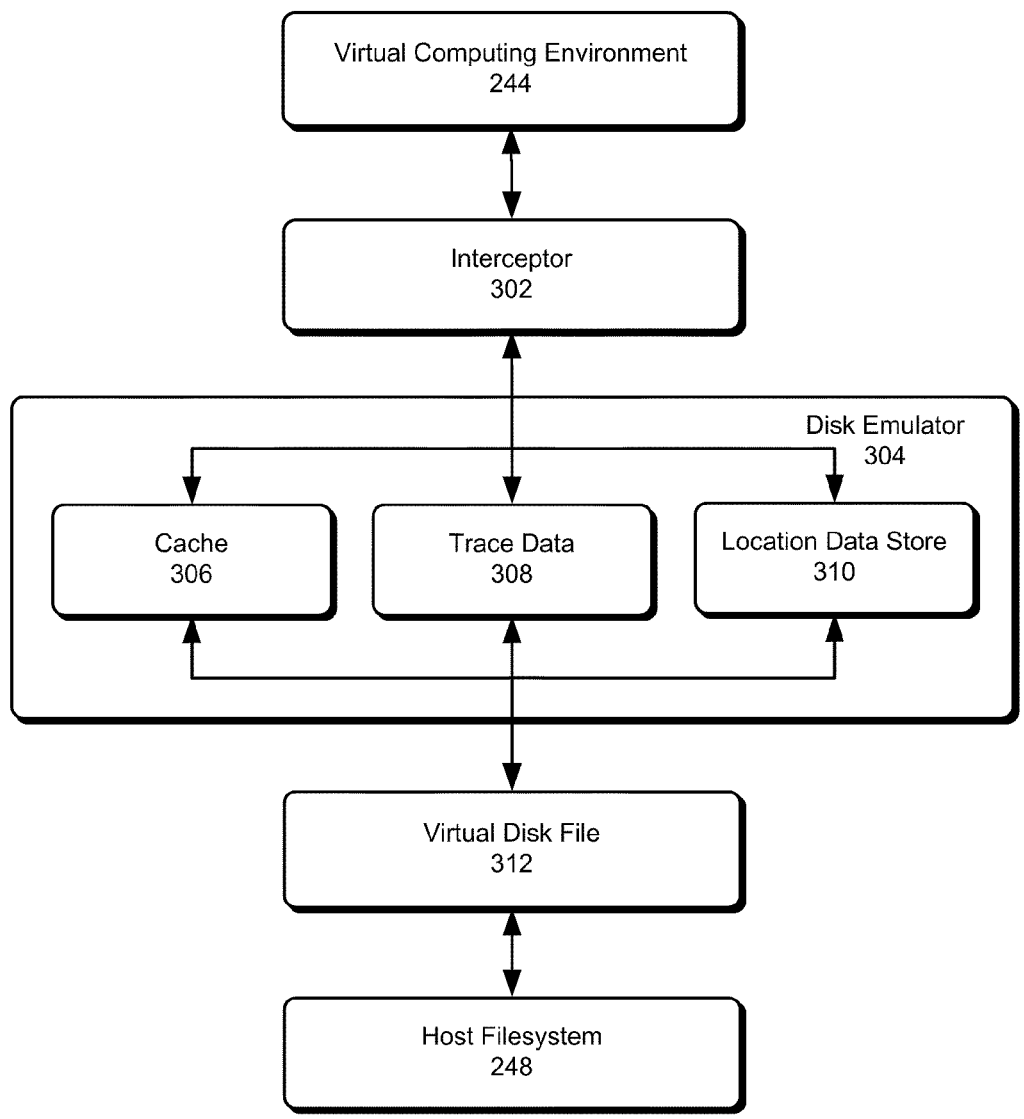
FIG. 3 shows a system for providing a virtual disk in a computer system in accordance with an embodiment.

FIG. 3 shows a system for providing a virtual disk (e.g., virtual disk 242 of FIG. 2) in a computer system (e.g., computer system 200 of FIG. 2) in accordance with an embodiment. In particular, the system of FIG. 3 includes an interceptor 302, a disk emulator 304, and a virtual disk file 312. Disk emulator 304 includes a cache 306, trace data 308, and a location data store 310.

In one or more embodiments, virtual disk file 312 stores data for the virtual disk. In other words, virtual disk file 312 may correspond to a single file on host filesystem 248 that contains data for multiple files, applications, settings, and/or other types of data managed by the virtual disk. Alternatively, data for the virtual disk may be stored in multiple virtual disk files on host filesystem 248. For example, multiple 2-Gb virtual disk files may be used to store data in the virtual disk to meet system limitations. Similarly, multiple virtual disk files may be used to provide redundancy that protects against data loss in the virtual disk. As discussed in further detail below, such redundancy may additionally be used to optimize data access during loading and/or execution of virtual computing environment 244.

Furthermore, virtual disk file 312 may utilize a flat disk format or a sparse disk format. The flat disk format may pre-allocate storage for the virtual disk in virtual disk file 312 so that offsets in the virtual disk map directly to offsets within virtual disk file 312. On the other hand, the sparse disk format may allocate storage on demand (e.g., as blocks are modified) to facilitate efficient use of space in the computer system. To enable the location of blocks within the virtual disk, the sparse disk format may maintain a mapping of block locations in the virtual disk to the physical offsets within virtual disk file 312 within location data store 310.

To improve security, reliability, space savings, and throughput in the virtual disk, individual blocks in virtual disk file 312 may be cached, encrypted, compressed, compacted, and/or hashed. For example, the contents of virtual disk file 312 may be encrypted using a key for the virtual disk and a different initialization vector for each block. In addition, the message authentication code (MAC) and/or hash of each block may include a unique set of identifiers (IDs) for the block to prevent blocks from being moved in virtual disk file 312. Furthermore, integrity may be verified by storing the MAC and/or hash in a parent block that references the block. If the block has been tampered with, the MAC and/or hash computed from the block may no longer match the MAC and/or hash stored in the parent block.

Both throughput and space savings may be improved by selecting a compression technique, compression strength, and/or compression parameters such that the compression and decompression of data in virtual disk file 312 occur more quickly than the transfer of data from the physical disk on which virtual disk file 312 is stored. For example, virtual disk file 312 may be stored on a hard disk drive (HDD) with a disk speed of 80 MB/s. A compression technique with a compression factor of 2 and a compression speed of 200 MB/s may double the effective data transfer speed of the hard disk drive to 160 MB/s while halving the size of virtual disk file 312 on the hard disk drive.

Compaction may provide additional space savings by facilitating the creation of contiguous blocks of storage within virtual disk file 312. Compaction may be performed by moving blocks to adjacent locations so that the remaining free space in virtual disk file 312 is contiguous (e.g., using a sparse disk format). Compaction may also include coalescing the contents of two or more blocks with overlapping or contiguous data ranges.

Finally, recently used blocks from virtual disk file 312 may be stored in an in-memory cache 306 for faster access. Cache 306 may correspond to a buffer cache associated with a host operating system within which virtual computing environment 244 executes, or cache 306 may correspond to a region of memory that is created and managed separately by disk emulator 304. As discussed below, efficient boot-up of virtual computing environment 244 may be facilitated by prefetching blocks into cache 306 based on common access patterns for reading blocks from virtual disk file 312.

As mentioned previously, the virtual disk may appear as a physical disk on the computer system. As a result, I/O operations to the virtual disk may utilize the same interfaces (e.g., kernel block storage interfaces) as I/O operations to physical disks on the computer system. To produce the appearance of a physical disk, interceptor 302 may intercept I/O operations from virtual computing environment 244 to the virtual disk. Interceptor 302 may be implemented as a kernel driver, filesystem driver, partition driver, and/or disk driver on the computer system. Interceptor 302 may also be implemented as an in-process shim within a hypervisor for virtual computing environment 244 and/or on hardware in the computer system.

Disk emulator 304 may then process the I/O operations using cache 306 and/or location data store 310. To process I/O operations to the virtual disk, disk emulator 304 may use location data store 310 to locate blocks of data in virtual disk file 312. In one or more embodiments, location data store 310 corresponds to a snapshot of the virtual disk. More specifically, location data store 310 may map blocks in the snapshot to blocks in virtual disk file 312. The mapping may be stored in a binary tree, a B-tree, a page table, a linked list, and/or other data structure used to sort and manage blocks of data. For example, location data store 310 may be implemented using a dynamic data structure such as a B-tree to enable the use of variable-sized blocks (e.g., extents) in the virtual disk.

As mentioned above, interceptor 302 and/or disk emulator 304 may use trace data 308 to facilitate the execution of a startup process (e.g., boot-up process) that loads virtual computing environment 244 by reading blocks from the virtual disk. More specifically, interceptor 302 may generate trace data 308 by recording I/O operations during execution of the startup process into a trace file. Interceptor 302 may obtain additional trace data 308 from logs and/or other information collected by virtual computing environment 244.

Trace data 308 may also correspond to data obtained by monitoring the execution of the startup process on other computer systems. For example, trace data 308 may be generated by sending trace files for startup processes that have executed on multiple computer systems to a server (e.g., administration server 100 of FIG. 1). The server may then analyze the trace files and provide trace data 308 containing the most recent and/or relevant sequence of I/O operations to each virtual disk on each computer system. Generation of trace data 308 is discussed in further detail below with respect to FIG. 6.

Disk emulator 304 may then use trace data 308 to physically rearrange the blocks in virtual disk file 312 in a way that increases the speed of the startup process. First, disk emulator 304 may reorder the blocks in virtual disk file 312 to reduce latency and/or seek time during loading of virtual computing environment 244 from the virtual disk. To reorder the blocks, disk emulator 304 may obtain a set of block locations for the blocks (e.g., from location data store 310) and reorder (e.g., move, coalesce, replicate, etc.) the blocks to reflect a read order of the blocks from trace data 308. Disk emulator 304 may also increase the speed of the startup process by moving the blocks to higher-speed memory on a physical disk. For example, disk emulator 304 may copy the blocks to buffer memory on a hybrid hard drive (HHD) if virtual disk file 312 is stored on the platters of the HHD.

In one more embodiments, blocks in virtual disk file 312 are reordered during an idle state associated with use of the virtual disk. For example, disk emulator 304 may execute a background process that moves and/or copies blocks in virtual disk file 312 during periods in which virtual computing environment 244 is not being used by a user. Disk emulator 304 may also pause and/or throttle the background process during periods in which the user interacts with virtual computing environment 244. For example, disk emulator 304 may reduce use of computational resources by the background process upon detecting the use of I/O devices (e.g., keyboard, mouse, touchpad), interactive applications (e.g., media players, screen savers), and/or network or processor resources in virtual computing environment 244. Disk emulator 304 may thus continue reordering blocks during periods of decreased use of virtual computing environment 244 until the blocks are physically arranged according to the order in which the blocks are accessed by the startup process. Reordering of blocks in virtual disk file 312 is discussed in further detail below with respect to FIGS. 4 and 7.

Interceptor 302 and/or disk emulator 304 may additionally provide a prefetch mechanism that uses trace data 308 to prefetch blocks during execution of the startup process. The prefetch mechanism may begin executing upon detecting a trigger associated with executing the startup process. For example, the prefetch mechanism may be launched as the user provides authentication credentials to a hypervisor for accessing and executing virtual computing environment 244.

To prefetch blocks for use by the startup process, the prefetch mechanism may determine a progress of the startup process. For example, the prefetch mechanism may assess the progress of the startup process based on the volume of data read and/or the number of I/O operations issued by the startup process. The prefetch mechanism may then use the progress and trace data 308 to obtain blocks from virtual disk file 312 and store the blocks in cache 306 ahead of time so that virtual computing environment 244 loads from cache 306 instead of from virtual disk file 312.

If the blocks are encrypted, compressed, and/or associated with a hash in virtual disk file 312, the blocks may be decrypted, decompressed, and/or hash-checked before the blocks are loaded into cache 306. On the other hand, blocks that are encrypted, compressed, and/or associated with hashes may be written to cache 306 as-is if cache 306 corresponds to a buffer cache for a host operating system on the computer system and/or if further modification of data in the blocks is to occur at a later point (e.g., upon reading of the blocks by the startup process). Prefetching of blocks in virtual disk file 312 is discussed in further detail below with respect to FIGS. 5 and 8.

As a result, interceptor 302 and disk emulator 304 may facilitate the efficient execution of a startup process that loads virtual computing environment 244 from virtual disk file 312. In particular, the generation of trace data 308 from previous execution of the startup process may allow blocks in virtual disk file 312 to be physically rearranged, moved, and/or replicated in a way that enables faster on-disk processing of I/O operations issued by the startup process. Furthermore, trace data 308 may be used to prefetch the blocks during execution of the startup process so that the blocks are accessible to the startup process from an in-memory cache 306 instead of a physical disk (e.g., HDD, HHD). Finally, the combined reordering and prefetching of blocks may increase the processing speed of both I/O operations issued by the startup process and prefetch operations performed by the prefetching mechanism, thus producing a synergistic effect on the performance of the startup process.

Those skilled in the art will appreciate that the functionality of interceptor 302 and disk emulator 304 may be implemented in multiple ways. For example, interceptor 302 and disk emulator 304 may execute as separate applications, processes, and/or modules on the computer system. Features of interceptor 302 and disk emulator 304 may be interchanged between the two modules and/or provided by a third module. For example, some of the aforementioned functionality of disk emulator 304 may be provided by interceptor 302 and/or another application or process in the computer system. Alternatively, interceptor 302 and disk emulator 304 may be included in a single application or process that mediates I/O operations between the computer system and virtual disk and maps data in the virtual disk to blocks in virtual disk file 312.

Furthermore, the virtual disk of FIG. 3 may be interoperable with a portable storage device, such as portable storage device 160 of FIG. 1. As discussed above and in the above-referenced application, virtual computing environment 244 may be loaded from either the virtual disk or the portable storage device. Interceptor 302 and/or disk emulator 304 may thus include mechanisms for transferring and synchronizing data between the virtual disk and portable storage device. For example, virtual computing environment 244 may be copied from the portable storage device to the virtual disk and loaded from the virtual disk. Changes made to the virtual disk during execution may be propagated to the portable storage device to maintain an updated state of virtual 244 computing environment on the portable storage device.

The virtual disk may additionally be used as a mechanism for storing and organizing data (e.g., for virtual computing environment 244) on the portable storage device. The virtual disk (e.g., interceptor 302, disk emulator 304, virtual disk file 312) may be transferred from the portable storage device to physical storage (e.g., HDD) on the computer system and loaded from the physical storage. Changes to the virtual disk on the physical storage may then be copied back to the portable storage device to synchronize data between multiple copies of the virtual disk. On the other hand, virtual disk file 312 may continue to reside on the portable storage device as interceptor 302 and disk emulator 304 are loaded on the computer system and used to provide the virtual disk to the computer system. I/O operations to virtual disk file 312 on the portable storage device may thus be mediated by interceptor 302 and/or disk emulator 304.

Figure 4:
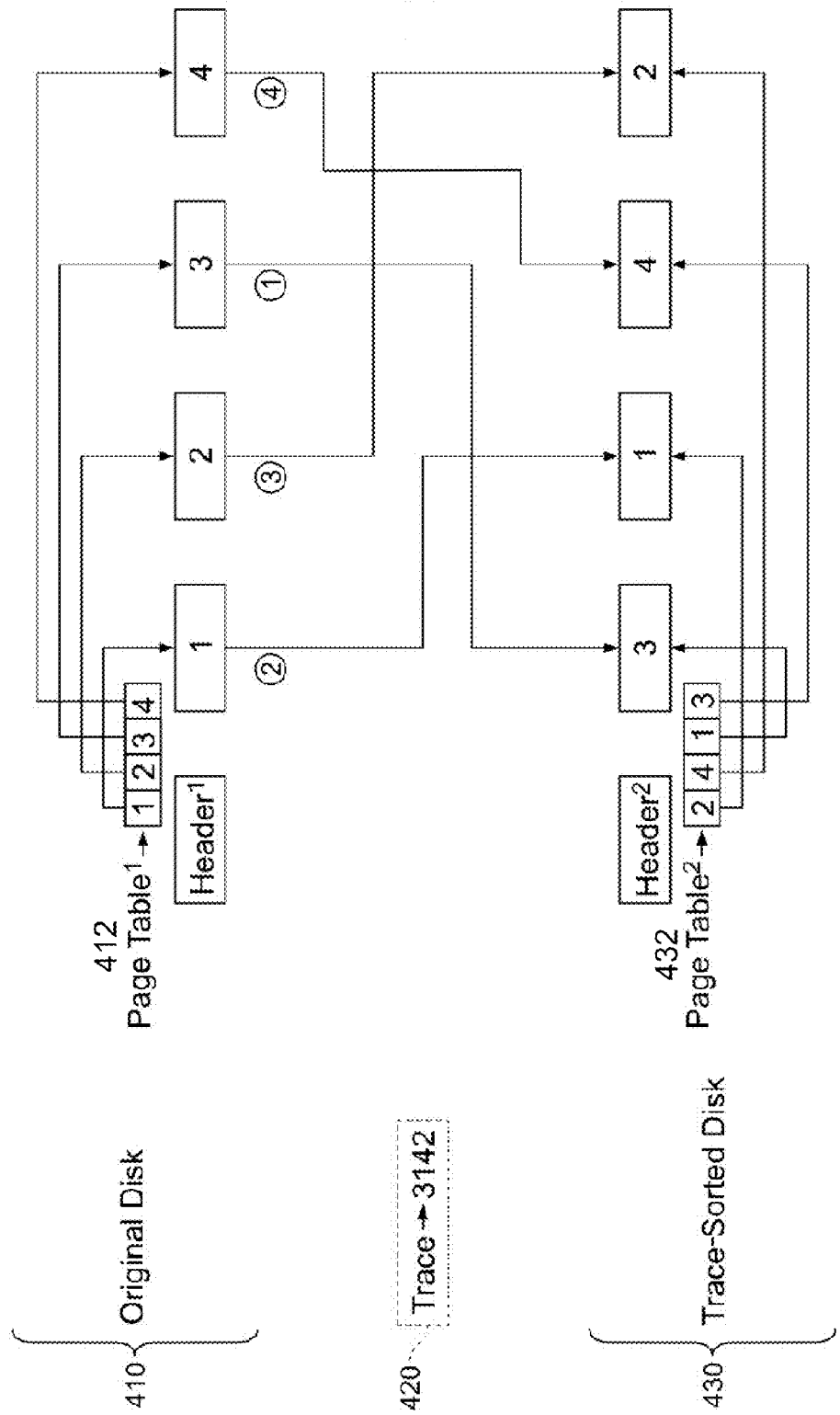
FIG. 4 shows an exemplary use of trace data to physically rearrange blocks in a virtual disk in accordance with an embodiment.

FIG. 4 shows an exemplary use of trace data 420 to physically rearrange blocks in a virtual disk in accordance with an embodiment. Trace data 420 may be obtained by recording I/O operations that access blocks from an original disk 410 corresponding to the virtual disk. As shown in FIG. 4, original disk 410 includes a first page table 412 and four data blocks, with virtual blocks 1, 2, 3, and 4 mapping to physical blocks 1, 2, 3, and 4, respectively.

Trace data 420 may indicate that blocks in original disk 410 are accessed in the following order: block 3, block 1, block 4, block 2. To reduce latency and/or seek time associated with accessing the blocks during startup, the blocks may be reordered to create a trace-sorted disk 430 that reflects the read order of the blocks from trace data 420.

In particular, trace data 420 may identify blocks 1, 2, 3, and 4 as read in the order of 3, 1, 4, and finally 2. Blocks 1, 2, 3, and 4 may then be located using page table 412 and physically rearranged (e.g., moved, copied, replicated) in trace-sorted disk 430 so that block 3 resides in the first physical block, block 1 resides in the second physical block, block 4 resides in the third physical block, and block 2 resides in the fourth physical block. Trace-sorted disk 430 may also contain a new page table 432 that maps the virtual blocks to the blocks' new physical locations (e.g., offsets). Because trace-sorted disk 430 contains a physical ordering of blocks that allows the blocks to be accessed sequentially by the I/O operations in trace data 420, the I/O operations may be processed more quickly on trace-sorted disk 430 than on original disk 410.

Figure 5:
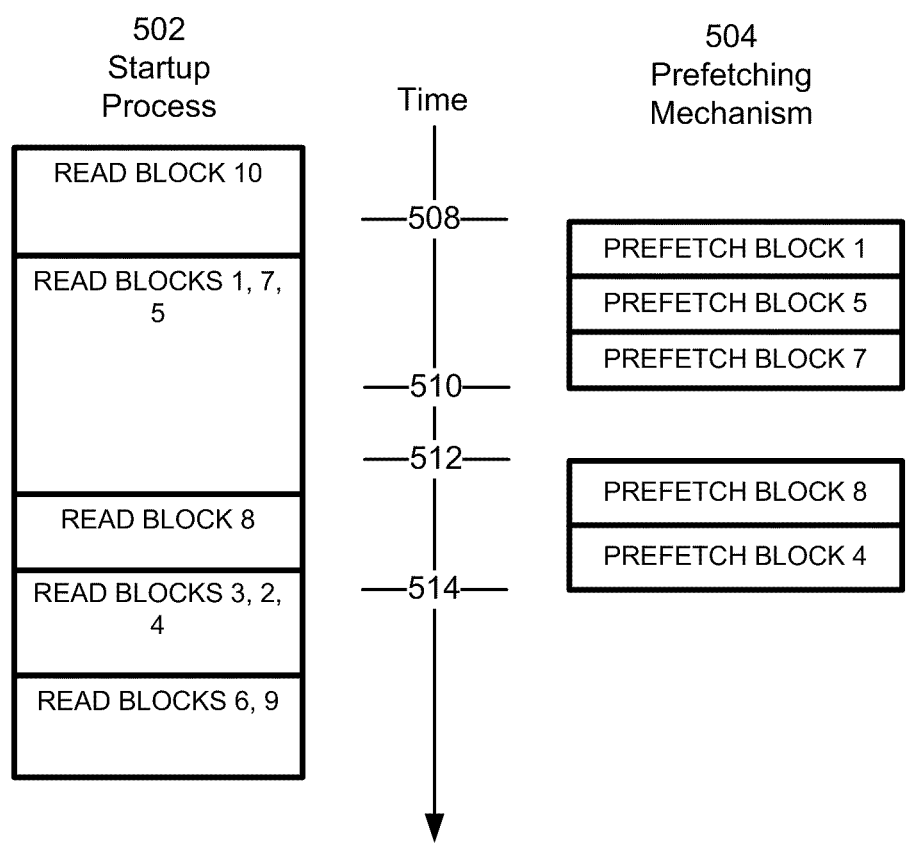
FIG. 5 shows an exemplary operation of a prefetching mechanism in accordance with an embodiment.

FIG. 5 shows an exemplary operation of a prefetching mechanism 504 in accordance with an embodiment. As described above, prefetching mechanism 504 may facilitate the execution of a startup process 502 that reads blocks from a virtual disk by prefetching the blocks during execution of startup process 502.

First, startup process 502 may begin executing by reading block 10 from the virtual disk. Once execution of startup process 502 is detected at time 508, prefetching mechanism 504 may prefetch blocks for use by startup process 502. In particular, prefetching mechanism 504 may use trace data associated with startup process 502 to obtain three blocks (e.g., blocks 1, 5, and 7) from the virtual disk and store the blocks in an in-memory cache that is accessible to startup process 502. By loading the blocks from the cache, startup process 502 may avoid slower I/O operations that read the blocks from an HDD containing the virtual disk and thus complete faster than a startup process that executes without the assistance of prefetching mechanism 504.

As shown in FIG. 5, the order in which prefetching mechanism 504 prefetches the blocks (e.g., 1, 5, 7) may differ from the order in which startup process 502 issues I/O operations for accessing the blocks (e.g., 1, 7, 5). Such a difference may result from the reordering of issued I/O operations by prefetching mechanism 504 to reduce latency associated with performing the I/O operations. For example, prefetching mechanism 504 may order the I/O operations to reflect a sequential layout of the blocks on the HDD. Processing of the I/O operations according to the sequential layout may thus require less seeking than processing of the I/O operations in the order specified by startup process 502.

At time 510, prefetching mechanism 504 may complete the first set of block prefetches. Prefetching mechanism 504 may also refrain from performing additional prefetches based on a prefetch window for startup process 502 and/or the size of the cache. For example, prefetching mechanism 504 may execute so that blocks are prefetched within a prefetch window spanning two seconds after the current progress of startup process 502. Similarly, prefetching mechanism 504 may prefetch blocks from the virtual disk until a cache that is the size of three blocks is filled. As a result, prefetching mechanism 504 may wait to prefetch additional blocks after blocks 1, 5, and 7 until startup process 502 reads one or more of the prefetched blocks from the cache and/or new I/O operations appear within the two-second prefetch window.

At time 512, prefetching mechanism 504 may prefetch block 8 because startup process 502 has read blocks 1, 5, and/or 7 from the cache and/or an I/O operation for reading block 8 appears within the prefetch window. Prefetching mechanism 504 may then prefetch block 4 in anticipation of an I/O operation that reads block 4. However, startup process 502 may issue three I/O operations in parallel that read from blocks 3, 2, and 4 instead of just block 4.

Consequently, startup process 502 may be required to read blocks 3 and 2 from a physical disk (e.g., HDD) instead of the cache. Furthermore, the cache misses for blocks 3 and 2 may result in adjustment of the prefetch window and/or cache. For example, the prefetch window may be reduced to 0 seconds at time 514 to discontinue the prefetch if the cache misses for blocks 3 and 2 indicate that startup process 502 differs too greatly from the previous startup process associated with the trace data. On the other hand, the size of the cache may be increased if blocks 3 and 2 were prefetched and evicted from the cache before startup process 502 was able to read the blocks from the cache. In other words, the execution of prefetching mechanism 504 after time 514 may be adjusted and/or discontinued based on the performance of prefetching mechanism 504 up to time 514.

Figure 6:
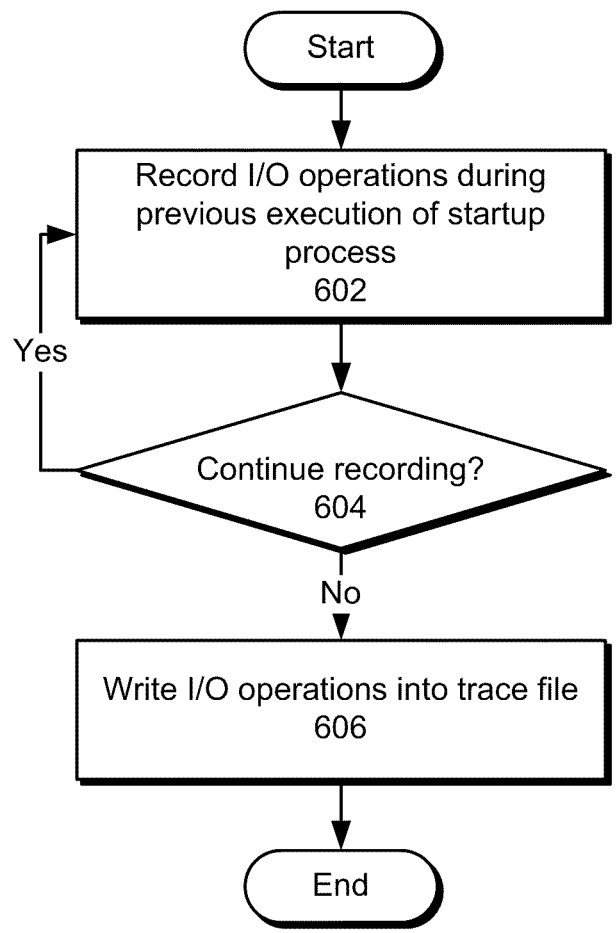
FIG. 6 shows a flowchart illustrating the process of generating trace data associated with a startup process that reads blocks from a virtual disk in accordance with an embodiment.

FIG. 6 shows a flowchart illustrating the process of generating trace data associated with a startup process that reads blocks from a virtual disk in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, I/O operations are recorded during previous execution of the startup process (operation 602). The I/O operations may be associated with the virtual disk, other virtual disks, and/or a virtual computing environment that loads from the virtual disk(s). The I/O operations may continue to be recorded (operation 604) until the startup process completes execution. For example, recording of the I/O operations may be discontinued after the startup process indicates the completion of execution by remaining in an idle state for a pre-specified period and/or communication from a guest process (e.g., application) associated with the startup process is received.

The recorded I/O operations may then be written into a trace file (operation 606). As discussed below, the trace file may be used to physically rearrange blocks in the virtual disk and/or prefetch blocks during subsequent execution of the startup process.

Figure 7:
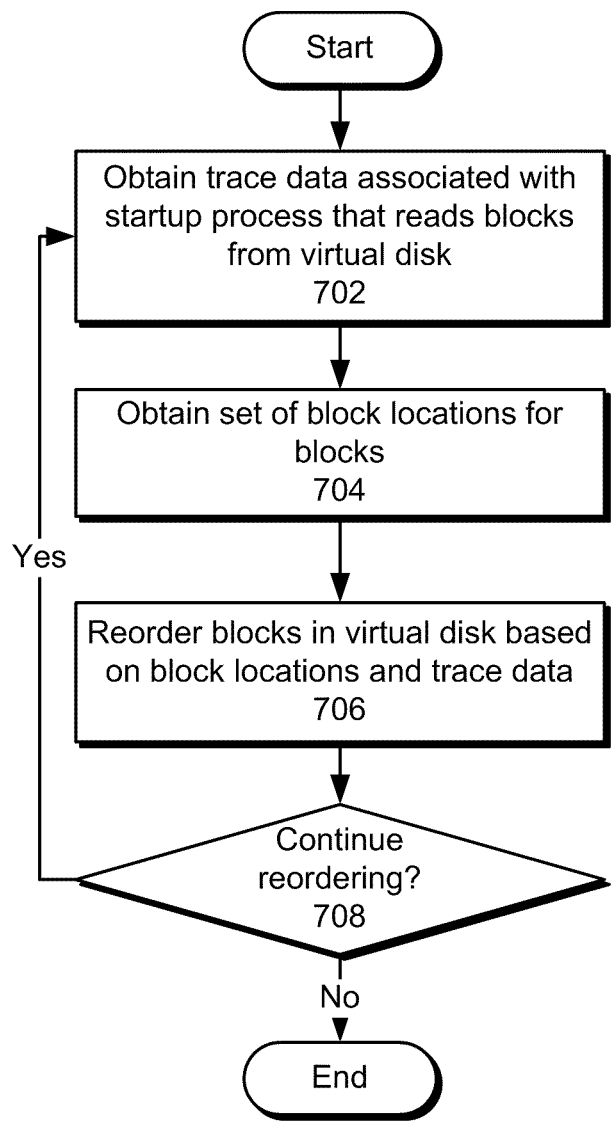
FIG. 7 shows a flowchart illustrating the process of facilitating the use of a virtual disk in accordance with an embodiment.

FIG. 7 shows a flowchart illustrating the process of facilitating the use of a virtual disk in accordance with an embodiment. In one or more embodiments, one or more of the steps may be omitted, repeated, and/or performed in a different order. Accordingly, the specific arrangement of steps shown in FIG. 7 should not be construed as limiting the scope of the embodiments.

Initially, trace data associated with a startup process that reads blocks from the virtual disk is obtained (operation 702). The startup process may correspond to a boot-up process of a virtual computing environment (e.g., virtual machine, virtualized application, etc.) from the virtual disk. The trace data may specify a read order of blocks in the virtual disk as recorded during previous execution of the startup process. Next, a set of block locations for the blocks is obtained (operation 704). For example, the block locations may be obtained by identifying the blocks from the trace data and locating the blocks using a page table and/or other location data store for the virtual disk.

The blocks are then reordered in the virtual disk based on the block locations and the trace data (operation 706). For example, the blocks may be moved, copied, and/or replicated to reflect the read order from the trace data and, in turn, reduce latency and/or seek time associated with reading the blocks. Increased performance of the startup process may further be enabled by moving the blocks to buffer, flash, and/or higher-speed memory on a physical disk such as an HDD and/or HHD.

The blocks may continue to be reordered (operation 708) until the physical arrangement of the blocks is optimized for I/O operations from the startup process. For example, reordering of the blocks may begin during an idle state associated with use of the virtual disk and may be discontinued and/or throttled once use of the virtual disk is increased. The reordering may then resume (e.g., upon reaching another idle state) and/or continue until the physical order of the blocks reflects the order in which the blocks are read by the startup process. If the reordering is to continue, trace data associated with the startup process and block locations for the blocks (operation 702-704) are obtained and used to reorder the blocks in the virtual disk (operation 706) until reordering of the blocks is no longer necessary.

Figure 8:
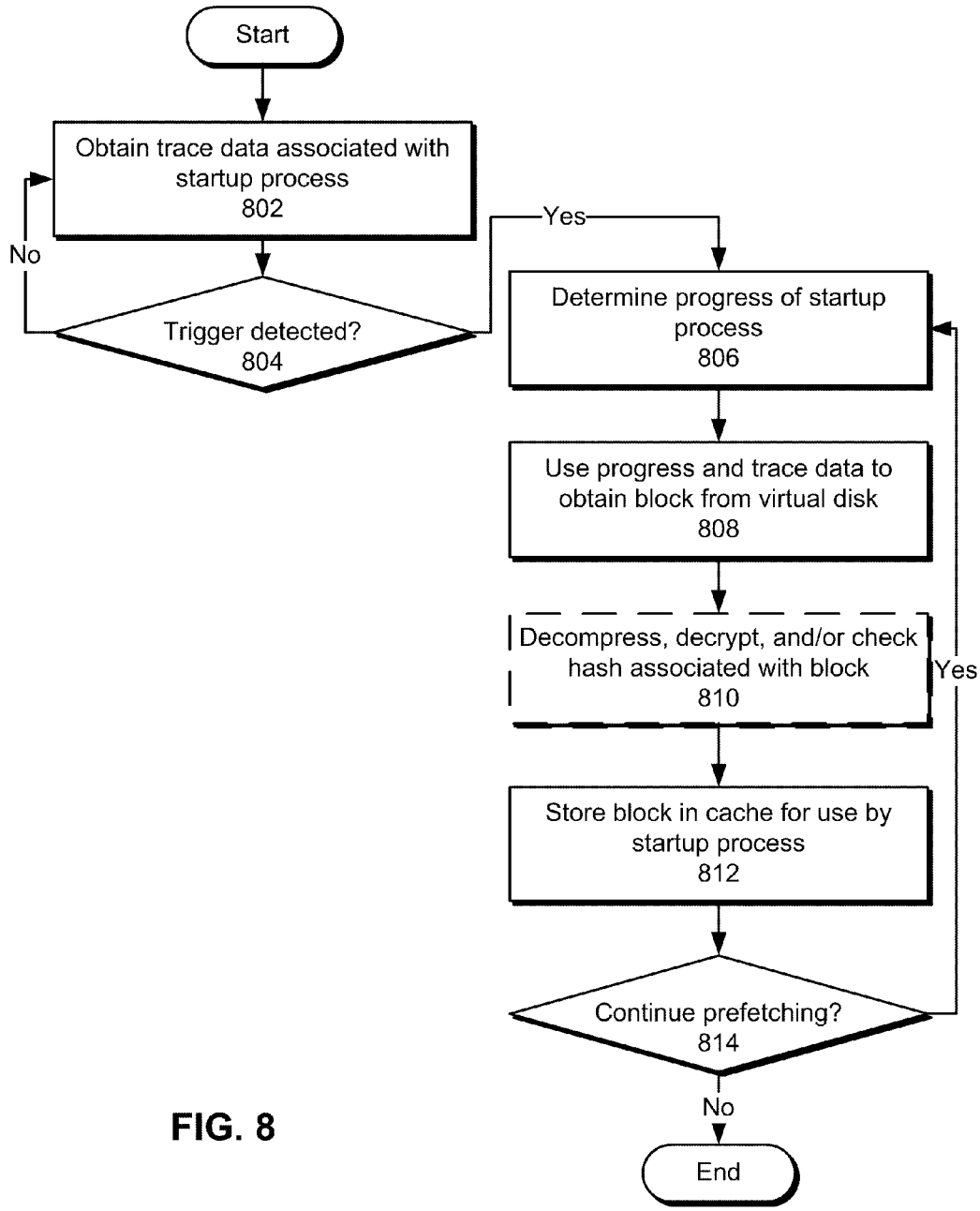
FIG. 8 shows a flowchart illustrating the process of facilitating the execution of a startup process that reads blocks from a virtual disk in accordance with an embodiment.

FIG. 8 shows a flowchart illustrating the process of facilitating the execution of a startup process that reads blocks from a virtual disk in accordance with an embodiment. In one or more embodiments, one or more of the steps may be omitted, repeated, and/or performed in a different order. Accordingly, the specific arrangement of steps shown in FIG. 8 should not be construed as limiting the scope of the embodiments.

First, trace data associated with the startup process is obtained (operation 802). As described above, the trace data may contain a sequence of I/O operations issued by the startup process to read blocks from the virtual disk. Next, a trigger associated with execution of the startup process may be detected (operation 804). For example, the trigger may correspond to authentication of a user prior to interaction with the virtual computing environment by the user. If the trigger is not detected, the trace data may continue to be obtained (operation 802) in preparation for subsequent execution of the startup process.

If the trigger is detected (e.g., execution of the startup process has begun), the progress of the startup process is determined (operation 806). Next, the progress and trace data are used to prefetch one or more blocks from the virtual disk for use by the startup process. In particular, the progress and trace data are used to obtain a block from the virtual disk (operation 808). The block may also be optionally decompressed, decrypted, and/or hash-checked (operation 810). The block may then be stored in a cache for use by the process (operation 812).

Prefetching of blocks may continue (operation 814) based on a prefetch window for the startup process, use of the prefetched blocks by the startup process, idle periods of the startup process, and/or a size of the cache. For example, operations 806-812 may be repeated if multiple I/O operations appear in the prefetch window and/or the cache includes space for more blocks. The I/O operations may additionally be reordered to reduce latency associated with performing the I/O operations (e.g., operations 808-812) during prefetch.

On the other hand, operations 806-812 may be paused, readjusted, and/or discontinued if no new I/O operations appear in the prefetch window and/or the prefetched blocks are not being used by the startup process. For example, the prefetch may be readjusted (e.g., fast-forwarded) if the prefetching falls behind the reading of blocks by the startup process. Along the same lines, the prefetch may be discontinued if the startup process issues I/O requests for blocks that differ from the prefetched blocks. Finally, the prefetch may be paused if prefetched blocks are evicted from the cache before the startup process is able to read the blocks from the cache.

The description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the use of a virtual disk, comprising:
    obtaining trace data associated with a previous execution of a startup process that reads blocks from the virtual disk, wherein the virtual disk is comprised of one or more files on one or more physical media;
    physically rearranging the blocks on the one or more physical media based on the trace data when the virtual disk is idle to increase the speed of subsequent executions of the startup process; and
    prefetching the rearranged blocks during execution of the startup process using the trace data via a prefetching mechanism, wherein
    the prefetching of the rearranged data comprises using trace data associated with the startup process to obtain three blocks from the virtual disk and store the three blocks in memory accessible to the startup process,
    the trace data reflects an order in which the blocks are read by the startup process, and
    the prefetching mechanism refrains from performing additional prefetches based on a prefetch window for the startup process, a size of a cache, or both.

2. The computer-implemented method of claim 1, wherein obtaining the trace data associated with the startup process involves at least one of:
    recording input/output (I/O) operations during previous execution of the startup process into a trace file; and
    reading the trace data from the trace file.

3. The computer-implemented method of claim 2, wherein the recording is discontinued after:
- the startup process remains in an idle state for a pre-specified period; or
- communication from a guest process associated with the startup process is received.

4. The computer-implemented method of claim 2, wherein the I/O operations are associated with the virtual disk, a virtual computing environment, or other virtual disks.

5. The computer-implemented method of claim 1, wherein physically rearranging the blocks based on the trace data to increase the speed of the startup process involves:
- obtaining a set of block locations for the blocks; and
- reordering the blocks in the virtual disk based on the block locations and the trace data.

6. The computer-implemented method of claim 5, wherein the blocks are reordered during an idle state associated with use of the virtual disk.

7. The computer-implemented method of claim 5, wherein reordering the blocks in the virtual disk based on the block locations and the trace data involves at least one of:
- moving the blocks to buffer memory on a physical disk; and
- reordering or replicating the blocks to reflect a read order of the blocks from the trace data.

8. The computer-implemented method of claim 1, wherein the startup process corresponds to a boot-up process of a virtual computing environment from the virtual disk.

9. A system for facilitating the use of a virtual disk, comprising:
- an interceptor configured to generate trace data associated with a previous execution of a startup process that reads blocks from the virtual disk, wherein the virtual disk is comprised of one or more files on one or more physical media;
- a disk emulator configured to physically rearrange the blocks based on the trace data when the virtual disk is idle to increase the speed of subsequent executions of the startup process; and
- a prefetcher configured to prefetch the rearranged blocks during execution of the startup process using the trace data, wherein
- the prefetcher is further configured to use trace data associated with the startup process to obtain three blocks from the virtual disk and store the three blocks in memory accessible to the startup process,
- the trace data reflects an order in which the blocks are read by the startup process, and
- the prefetcher refrains from performing additional prefetches based on a prefetch window for the startup process, a size of a cache, or both.

10. The system of claim 9, wherein the interceptor generates the trace data by recording input/output (I/O) operations during previous execution of the startup process.

11. The system of claim 10, wherein the recording is discontinued after:
- the startup process remains in an idle state for a pre-specified period; or
- communication from a guest process associated with the startup process is received.

12. The system of claim 9, wherein physically rearranging the blocks based on the trace data to increase the speed of the startup process involves:
- obtaining a set of block locations for the blocks; and
- reordering the blocks in the virtual disk based on the block locations and the trace data.

13. The system of claim 12, wherein the blocks are reordered during an idle state associated with use of the virtual disk.

14. The system of claim 12, wherein reordering the blocks in the virtual disk based on the block locations and the trace data involves at least one of:
- moving the blocks to buffer memory on a physical disk; and
- reordering or replicating the blocks to reflect a read order of the blocks from the trace data.

15. The system of claim 9, wherein the startup process corresponds to a boot-up process of a virtual computing environment from the virtual disk.

16. A non-transitory computer-readable storage medium storing instructions that when executed by a computer cause the computer to perform a method for facilitating the use of a virtual disk, the method comprising:
- obtaining trace data associated with a previous execution of a startup process that reads blocks from the virtual disk, wherein the virtual disk is comprised of one or more files on one or more physical media;
- physically rearranging the blocks based on the trace data when the virtual disk is idle to increase the speed of subsequent executions of the startup process; and
- prefetching the rearranged blocks during execution of the startup process using the trace data via a prefetching mechanism, wherein
- the prefetching of the rearranged data comprises using trace data associated with the stump process to obtain three blocks from the virtual disk and store the three blocks in memory accessible to the startup process,
- the trace data reflects an order in which the blocks are read by the startup process, and
- the prefetching mechanism refrains from performing additional prefetches based on a prefetch window for the startup process, a size of a cache, or both.

17. The non-transitory computer-readable storage medium of claim 16, wherein obtaining the trace data associated with the startup process involves at least one of:
- recording input/output (I/O) operations during previous execution of the startup process into a trace file; and
- reading the trace data from the trace file.

18. The non-transitory computer-readable storage medium of claim 17, wherein the recording is discontinued after:
- the startup process remains in an idle state for a pre-specified period; or
- communication from a guest process associated with the startup process is received.

19. The non-transitory computer-readable storage medium of claim 16, wherein physically rearranging the blocks based on the trace data to increase the speed of the startup process involves:
- obtaining a set of block locations for the blocks; and
- reordering the blocks in the virtual disk based on the block locations and the trace data.

20. The non-transitory computer-readable storage medium of claim 19, wherein reordering the blocks in the virtual disk based on the block locations and the trace data involves at least one of:
- moving the blocks to buffer memory on a physical disk; and
- reordering or replicating the blocks to reflect a read order of the blocks from the trace data.

21. A computer-implemented method for facilitating the execution of a startup process that reads blocks from a virtual disk, wherein the virtual disk is comprised of one or more files on one or more physical media, comprising:
obtaining trace data associated with a previous execution of the startup process; and
when the virtual disk is idle:
physically rearranging the blocks on the one or more physical media based on the trace data to increase the speed of subsequent executions of the startup process,
determining a progress of the startup process, and
using the progress and the trace data during the current execution of the startup process to prefetch blocks, via a prefetching mechanism, from the virtual disk for use by the startup process, the prefetch of the blocks comprises using trace data associated with the startup process to obtain three blocks from the virtual disk and store the three blocks in memory accessible to the startup process; and
during periods in which a user interacts with a virtual computing environment, pausing, throttling back, or both, a background process of a disk emulator, wherein
the trace data reflects an order in which the blocks are read by the startup process, and
the prefetching mechanism refrains from performing additional prefetches based on a prefetch window for the startup process, a size of a cache, or both.

22. The computer-implemented method of claim 21, wherein during execution of the startup process, the method further comprises:
reordering input/output (I/O) operations issued by the startup process to reduce latency associated with performing the I/O operations.

23. The computer-implemented method of claim 21, wherein using the progress and the trace data to prefetch blocks for use by the startup process involves:
obtaining the blocks from the virtual disk; and
storing the blocks in a cache for use by the startup process.

24. The computer-implemented method of claim 23, wherein using the progress and the trace data to prefetch blocks for use by the startup process further involves at least one of:
individually decompressing each of the blocks;
individually decrypting each of the blocks; and
individually checking a hash associated with each of the blocks.

25. The computer-implemented method of claim 21, wherein the blocks are prefetched based on at least one of:
a prefetch window for the startup process;
use of the prefetched blocks by the startup process;
idle periods of the startup process; and
a size of the cache.

26. The computer-implemented method of claim 25, wherein the prefetch is readjusted or discontinued if the prefetched blocks are not used by the startup process.

27. The computer-implemented method of claim 21, wherein prefetching of the blocks is initiated upon detecting a trigger associated with execution of the startup process.

28. The computer-implemented method of claim 21, wherein the startup process corresponds to a boot-up process of a virtual computing environment from the virtual disk.

29. A system for facilitating the execution of a startup process that reads blocks from a virtual disk, comprising:
an interceptor configured to generate trace data associated with a previous execution of a startup process that reads blocks from the virtual disk, wherein the virtual disk is comprised of one or more files on one or more physical media;
a disk emulator configured to:
physically rearrange the blocks on the one or more physical media, when the virtual disk is idle, based on the trace data obtained during the previous execution of the startup process to increase the speed of subsequent executions of the startup process, and
during periods in which a user interacts with a virtual computing environment, pausing, throttling back, or both, a background process of the disk emulator; and
a prefetching mechanism configured, during the current execution of the startup process, to:
determine a progress of the startup process; and
use the progress and the trace data to prefetch blocks from the virtual disk for use by the startup process, wherein
the prefetch of the blocks comprises using trace data associated with the startup process to obtain three blocks from the virtual disk and store the three blocks in memory accessible to the startup process,
the trace data reflects an order in which the blocks are read by the startup process, and
the prefetching mechanism refrains from performing additional prefetches based on a prefetch window for the startup process, a size of a cache, or both.

30. The system of claim 29, wherein during execution of the startup process, the prefetching mechanism is further configured to:
reorder input/output (I/O) operations issued by the startup process to reduce latency associated with performing the I/O operations.

31. The system of claim 29, wherein using the progress and the trace data to prefetch blocks for use by the startup process involves:
obtaining the blocks from the virtual disk; and
storing the blocks in a cache for use by the startup process.

32. The system of claim 29, wherein the blocks are prefetched based on at least one of:
a prefetch window for the startup process;
use of the prefetched blocks by the startup process;
idle periods of the startup process; and
a size of the cache.

33. The system of claim 32, wherein the prefetch is readjusted or discontinued if the prefetched blocks are not used by the startup process.

34. The system of claim 29, wherein prefetching of the blocks is initiated upon detecting a trigger associated with execution of the startup process.

35. The system of claim 29, wherein the startup process corresponds to a boot-up process of a virtual computing environment from the virtual disk.

36. A non-transitory computer-readable storage medium storing instructions that when executed by a computer cause the computer to perform a method for facilitating the execution of a startup process that reads blocks from a virtual disk, wherein the virtual disk is comprised of one or more files on one or more physical media, the method comprising:
obtaining trace data associated with a previous execution of the startup process; and
during a current execution of the startup process:
physically rearranging the blocks on the one or more physical media, when the virtual disk is idle, based on the trace data during the previous execution of the startup process to increase the speed of subsequent executions of the startup process,
determining a progress of the startup process, and using the progress and the trace data to prefetch blocks, via a prefetching mechanism, from the virtual disk for use by the startup process; and during periods in which a user interacts with a virtual computing environment, pausing, throttling back, or both, a background process of a disk emulator, wherein the prefetch of the blocks comprises using trace data associated with the startup process to obtain three blocks from the virtual disk and store the three h s in memory accessible to the startup process, the trace data reflects an order in which the blocks are read by the startup process, and the prefetching mechanism refrains from performing additional prefetches based on a prefetch window for the startup process, a size of a cache, or both.

37. The non-transitory computer-readable storage medium of claim 36, wherein during execution of the startup process, the method further comprises:
   reordering input/output (I/O) operations issued by the startup process to reduce latency associated with performing the I/O operations.

38. The non-transitory computer-readable storage medium of claim 36, wherein using the progress and the trace data to prefetch blocks for use by the startup process involves:
   obtaining the blocks from the virtual disk; and
   storing the blocks in a cache for use by the startup process.

39. The non-transitory computer-readable storage medium of claim 36, wherein the blocks are prefetched based on at least one of:
   a prefetch window for the startup process;
   use of the prefetched blocks by the startup process;
   idle periods of the startup process; and
   a size of the cache.

40. The non-transitory computer-readable storage medium of claim 36, wherein prefetching of the blocks is initiated upon detecting a trigger associated with execution of the startup process.

* * * * *